US006185099B1

United States Patent
Le Gal

(10) Patent No.: US 6,185,099 B1
(45) Date of Patent: Feb. 6, 2001

(54) COOLING DEVICE FOR AN ELECTRONIC POWER SYSTEM

(75) Inventor: Claude Le Gal, Nantes (FR)

(73) Assignee: Steve Igenierie, Nantes (FR)

( * ) Notice: Under 35 U.S.C. 154(b), the term of this patent shall be extended for 0 days.

(21) Appl. No.: 09/285,081

(22) Filed: Apr. 2, 1999

(30) Foreign Application Priority Data

Apr. 2, 1998 (FR) .................................................. 98 04095

(51) Int. Cl.[7] ..................................................... H05K 7/20
(52) U.S. Cl. ........................ 361/699; 165/80.4; 257/714; 336/58
(58) Field of Search ............................... 174/15.1, 17 LF; 336/58; 162/259.2; 165/80.4, 104.33; 257/714, 715; 361/698, 699, 707, 717, 718

(56) References Cited

U.S. PATENT DOCUMENTS

| 2,879,455 | * | 3/1959 | Scal . |
| 3,249,817 | * | 5/1966 | Sinclair . |
| 4,330,812 | * | 5/1982 | Token . |
| 4,331,830 | * | 5/1982 | Conway . |
| 4,633,371 | * | 12/1986 | Nagy . |
| 4,652,970 | * | 3/1987 | Watari . |
| 4,893,590 | * | 1/1990 | Kashimura . |
| 5,023,695 | * | 6/1991 | Umezawa . |
| 5,694,295 | * | 12/1997 | Mochizuki . |
| 5,720,342 | * | 2/1998 | Owens . |

FOREIGN PATENT DOCUMENTS

| 0 680 055 | 11/1995 | (EP) . |
| WO 97/30498 | 8/1997 | (WO) . |
| WO 98/27561 | 6/1998 | (WO) . |

OTHER PUBLICATIONS

"Contactless Charging and Communication for Electric Vehicles", *IEEE Industry Applications Magazine*, vol. 1, No. 6, Nov. 1995, pp. 4–11.

* cited by examiner

Primary Examiner—Gerald Tolin
(74) Attorney, Agent, or Firm—Young & Thompson

(57) ABSTRACT

Electronic power system is connected at an input to an electrical supply cable (24) and at an outlet to a conductive cable (17) connected to a system of current transmission, the whole of the device being adapted to be buried in the ground in a concrete box (1) such that the current transmission system will be able to transmit a current to an electrical machine such as an automobile that parks above it to receive a battery charge. A sealed metallic receptacle (2) in the form of a box filled with heat transfer liquid, is provided, a sealed compartment being located below the bottom (2a) of the latter box, in which is disposed the electronic power system of which at least one electronic power component is directly fixed to the lower surface of the bottom of the latter box, so as to give rise within the receptacle to stirring of the heat transfer liquid by thermosiphon effect.

20 Claims, 3 Drawing Sheets

COOLING DEVICE FOR AN ELECTRONIC POWER SYSTEM

This application corresponds to French application 98 04095 filed Apr. 2, 1998, the disclosure of which is incorporated herein by reference.

The present invention relates to a cooling device for an electronic power system, adapted particularly to permit recharging an electrical storage battery of an automotive vehicle, at a predetermined position on a public route.

There are already known electric supply connections to permit recharging an automotive vehicle battery, on a public route, connecting the battery to the outlet by conductors. However, such outlets can be subjected to acts of vandalism and it has thus been proposed to bury recharging systems, and to carry out recharging by induction instead of using conductive cables. This known system consists in placing in a concrete box buried in the ground an electronic power housing, connected, at the input, to an electric supply cable and, at its output to a conductive cable connected to an inductor, the concrete box being closed at the level of the soil by a cast iron plate which is pierced to permit access to the inductor, this latter being designed to give rise, under the action of the electronic power housing, to an electromagnetic field acting on an inductive carried by the automotive vehicle parked above the inductor, to recharge the battery of the vehicle.

The electronic power housing generally comprises power transistors which give off substantial heat, during their operation, for example of the order of 200 watts. This emitted heat must be dissipated to avoid a temperature within the housing exceeding a temperature of the order of 50–60° C., beyond which the electronic components can be damaged. To this end, there is used as a cooling device, coils filled with cold water covering the electronic housing at the level of the emplacement of the power transistors, the circulation of cold water being carried out by a pump. It is not possible to cool the housing with ambient air by providing holes through the cast iron plate, because the concrete box must be sealed. There could also be provided, instead of cold water coils, air ventilation devices within the box.

However, these cooling devices are complicated and use moving members which can fail in the course of their operation. Moreover, these cooling devices use a drive system which consumes energy and hence increases the cost of the assembly.

The invention has for its object to overcome the mentioned drawbacks and to provide a cooling device for an electronic power system, which will be of simple construction and require no or little maintenance.

To this end, the invention has for its object a cooling device for an electronic power system, said electronic power system being connected, at the input, to an electric supply cable, and at its output, to a conductor cable connected to a power transmission system, the assembly of the device being adapted to be buried in the ground in a concrete box such that the current power transmission system will be adapted to transmit power to an electrical machine external to the device, characterized in that it comprises a sealed metallic receptacle in the form of a box filled with heat conductive liquid, a sealed compartment being located below the bottom of the box, in which is disposed the electronic power system of which at least one electronic power component is directly fixed to the lower surface of the bottom of the box, in an emplacement adapted to give rise in the receptacle to agitation of the heat conductive liquid by thermosiphoning, to dissipate in the liquid the heat discharged by the electronic power component which heats up in operation, thereby to ensure that the electronic power components do not exceed the maximum temperature tolerated by the electronic components, no matter what the external climatic conditions.

In a first embodiment, the current transmission system comprises an inductor connected to the conductive cable and disposed in a housing, said conductor housing being immersed in the heat conductive liquid contained in the metallic receptacle, said inductor being adapted to give rise to a current induced in an electrical machine located above the inductor, for example for recharging a battery of an automotive vehicle.

In an another embodiment, the current transmission system comprises a current connection to the conductor cable which passes through the receptacle over all its height, for current transmission by contact, said connection being located preferably at the level of an upper closure plate of the receptacle.

As a modification, the cable could pass through the receptacle and be connected to an inductor external to the receptacle.

Preferably, the receptacle comprises a chimney, preferably of generally truncated conical shape, extending vertically from the bottom of the receptacle and adapted to be traversed by the conductor cable which passes through, in a sealed manner, the bottom of the box and opens into the sealed compartment, so as to accelerate the thermal agitation in the liquid. The chimney is preferably substantially at the center of the receptacle, and the electronic power components are fixed to the bottom of the receptacle in emplacements spaced about the base of the chimney.

According to another characteristic, the inductor housing comprises at its base a hollow bottom in the form of a bell adapted to cap laterally the top of the chimney, so that said bell is bathed in the upper warm region of the liquid, so as to permit discharge of heat, by means of the inductor housing, to the ambient air.

According to still another characteristic, the bottom of the receptacle comprises at least one reinforcement projecting into the compartment of the electronic power system, the electronic power component or components being fixed on the lower surface of the bottom of the reinforcement or reinforcements.

It can be provided that the bottom of the receptacle comprises lugs projecting inwardly of the receptacle to permit sinking therein the securement means for the electronic component, from the lower surface of the bottom of the receptacle.

Preferably, the receptacle comprises at its base a peripheral downwardly extending skirt delimiting with the lower surface of the bottom of the receptacle the mentioned compartment. Preferably, the bottom of the compartment is closed by a closure plate, if desired with the interposition of a sealing join between the plate and the lower edge of the skirt of the receptacle.

According to still another characteristic, the mentioned skirt comprises an internal partition delimiting a recess separated from the mentioned compartment to receive a set of terminals between said electronic power system and the supply cable, said recess opening on the one hand, through a hole provided in the internal partition, into the compartment of the electronic power system for electrical connection between said system and the terminal set, and on the other hand through a hole provided in the external wall of the skirt on the exterior for passage of the supply cable. In this case, the bottom of the recess can be closed by a closure plate independently of the closure plate of the compartment, with if desired the interposition of an individual sealing joint.

In a particular embodiment, the receptacle comprises on its internal side wall, support means adapted to coact with bearing means fixed to the inductor housing, to position and support the inductor housing within the receptacle. For example, the support means can be comprised by vertical ribs projecting from the internal side walls of the receptacle and the bearing means by tongues extending within a plane perpendicular to the vertical axis of the receptacle, from a metallic crown secured to the inductor housing, said tongues being adapted to rest on the tops of the ribs. Securement means could be provided, adapted to pass through at least one tongue and the associated rib, to immobilize the inductor housing in the receptacle.

According to another characteristic, the receptacle comprises on its upper edge a peripheral collar extending outwardly in a plane perpendicular to the axis of the receptacle, to fix thereon, with if desired the interposition of a sealing joint, an upper closure plate, preferably of cast iron, adapted to be positioned at ground level. In this case, said upper plate can comprise a central hole adapted to receive a plastic cover which is fixed to the top of the inductor housing.

According to still another characteristic, said collar is adapted to rest on the upper peripheral edge of the box which is made of reinforced concrete to facilitate heat transfer between the surrounding ground and the receptacle.

Generally, electronic power components of the system are power transistors. Preferably, the receptacle has a substantially truncated pyramidal shape, whose large base opens upwardly.

The invention will be better understood, and other objects, details, characteristics and advantages of it will become apparent more clearly in the course of the detailed explanatory description which follows, of a particular embodiment of the invention that is presently preferred, given solely by way of illustration and not limitation, with reference to the accompanying schematic drawings, in which.

Figure 1:
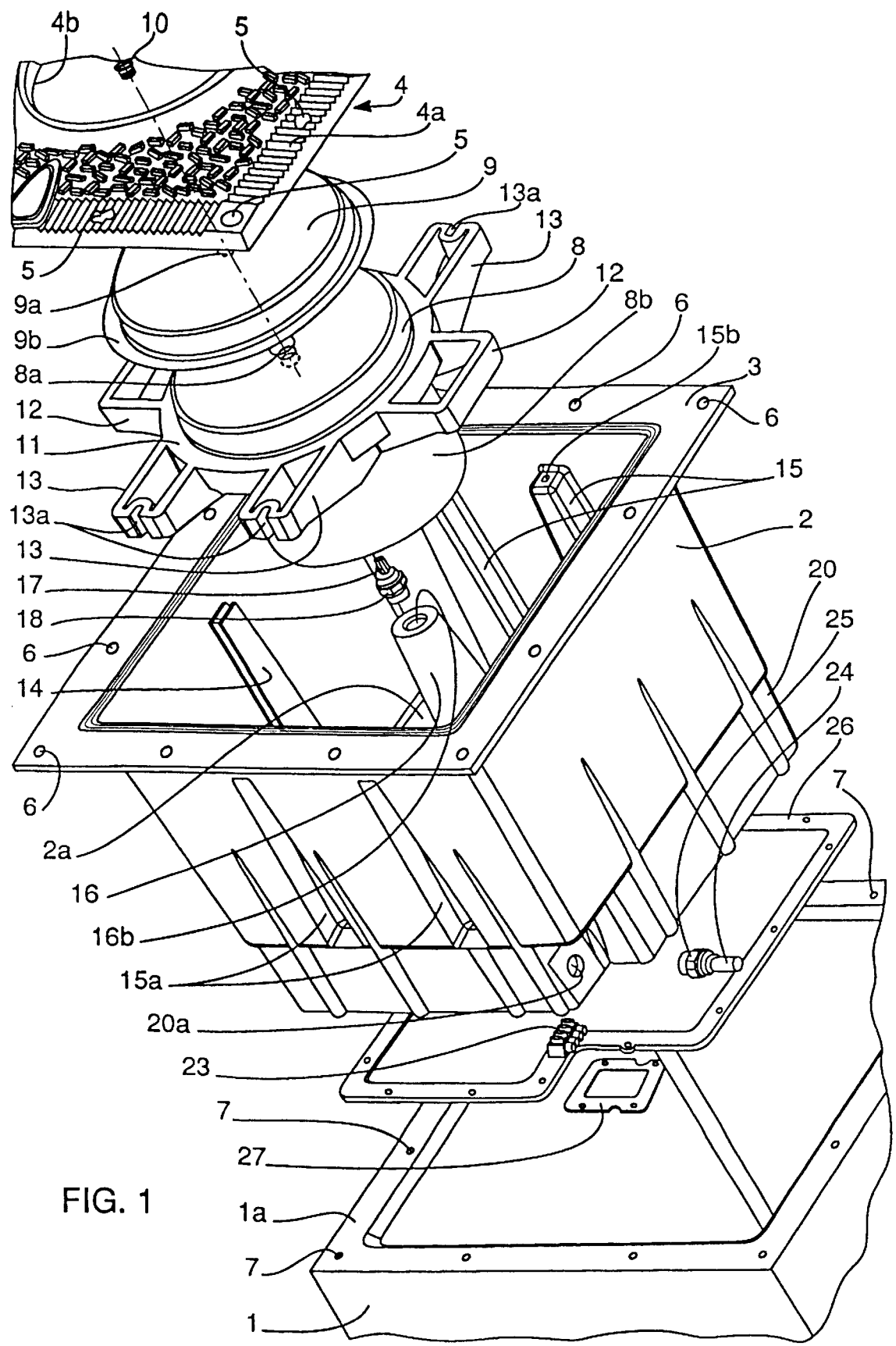
FIG. 1 is an exploded perspective view of the assembly of the device according to the invention.

In FIG. 1 is partially shown a reinforced concrete box 1 in the general form of a hollow cube, opening upwardly, in which is disposed a receptacle 2 in the form of an upwardly opening box and having a transverse cross-sectional that is substantially square. The receptacle 2 comprises an upper peripheral collar 3 extending outwardly in a substantially horizontal plane perpendicular to the axis of the receptacle, said collar 3 being adapted to bear against the upper peripheral edge 1a of the reinforced concrete box 1 with if desired the interposition of a sealing joint.

An upper closure plate 4 of cast iron is adapted to cover the opening of the receptacle 2 and to bear by its periphery 4a on the upper surface of the collar 3 of the receptacle 2. The upper cast iron plate 4, the collar 3 and the upper peripheral edge 1a of the reinforced concrete box 1 comprise respectively holes 5, 6 and 7 for their assembly by securement means (not shown), for example by screws.

The cast iron plate 4 is adapted to be placed at ground level, for example at the level of the sidewalk or public route, for reasons which are indicated hereinafter. The cast iron plate 4 comprises at its center a circular throughhole 4b to receive the upper end of an inductor 8 moulded in a housing of circular cylindrical shape. The housing of the inductor 8 is adapted to be capped by a plastic cover 9 covering its upper portion and which is received in the hole 4b of the cast iron plate 4. The cover 9 comprises at its center a piercing 9a which is adapted to be aligned with a tapping 8a provided at the center of the upper surface of the housing of inductor 8, to permit securing the cover 9 on the housing of inductor 8, by means of a screw 10 passing through the piercing 9a of the cover 9 and screwing into the tapping 8a of the housing of inductor 8. The cover 9 being plastic, the transfer of electromagnetic energy can take place by induction between the upper surface of the inductor 8, through the cover 9 and the hole 4b of the cast iron plate 4, toward an induction positioned above and not shown in the drawings.

A metallic crown 11, preferably of aluminum, is ensleeved and fixed on the external side wall of the housing of inductor 8, the cover 9 having at its base a collar 9b projecting outwardly which is adapted to bear on the metallic crown 11. The metallic crown 11 comprises a plurality of tongues projecting laterally from its peripheral portion, extending in a plane substantially perpendicular to the axis of the crown. For example, the crown 11 comprises a first pair of tongues 12 diametrically opposed and having a shape which is substantially rectangular and open, as well as two other pairs of tongues 13 extending in a direction perpendicular to the first pair of tongues 12, said tongues 13 extending parallel on opposite sides of the crown 11. In contrast to the tongues 12, the tongues 13 comprise at their end an axial through groove 13a whose object will be explained later. The tongues 13 are also open, like the tongues 12, to reduce the overall mass of the crown 11.

Figure 2:
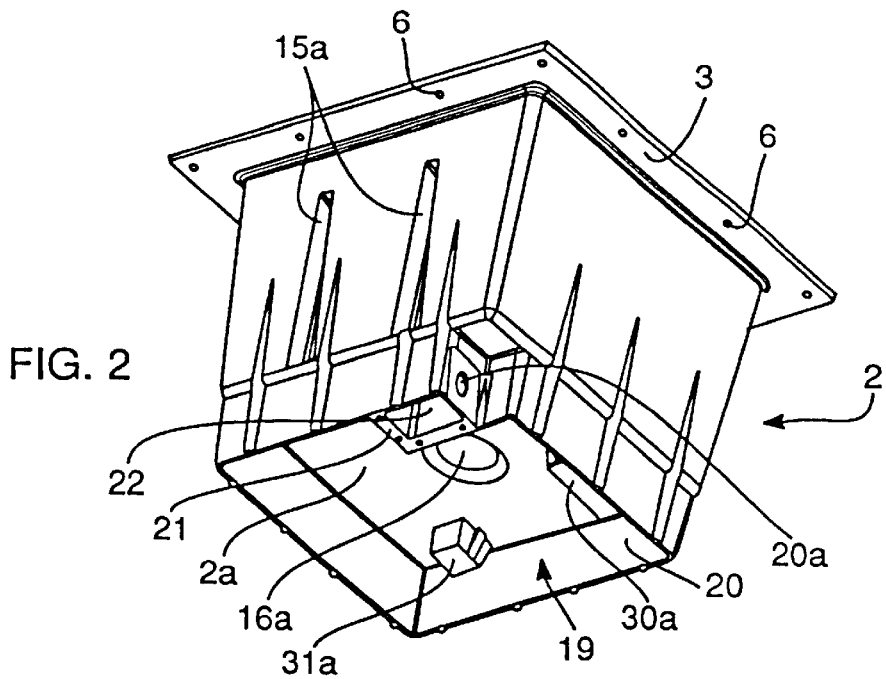
FIG. 2 is a perspective view from below of the receptacle of FIG. 1.
Figure 3:
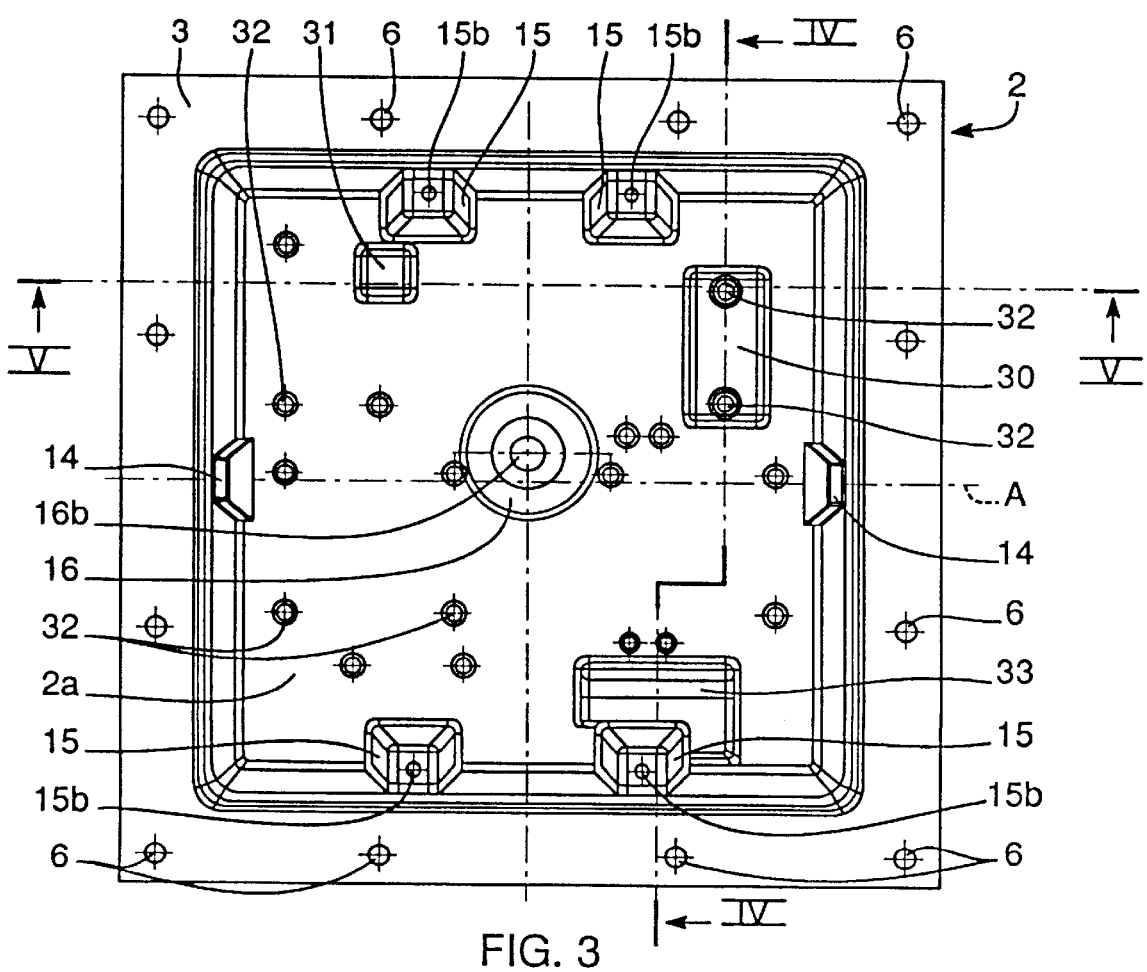
FIG. 3 is a plan view from above of the receptacle of FIG. 2.

With reference particularly to FIG. 3, it will be seen that the receptacle 2 comprises a pair of inwardly projecting ribs 14 extending substantially vertically along two internal opposite walls of the receptacle 2, from the bottom 2a of the receptacle 2 to the vicinity of the upper opening of the receptacle. On the two other opposite internal side walls of the receptacle 2 are provided inwardly projecting ribs 15 extending substantially vertically. The ribs 15 are parallel to each other and aligned two by two in a direction parallel to the axis A passing through the pair of ribs 14. The ribs 15 are hollow, as seen by the reinforcements 15a on the external side wall of the receptacle 2 (see FIGS. 1 and 2).

The lateral tongues 12 of the metallic crown 11 mentioned above are adapted to bear on the top of the ribs 14, whilst the lateral tongues 13 are adapted to bear on the top of the ribs 15. The housing of inductor 8 is fixed to the receptacle 2, by means of tongues 13 whose terminal grooves 13a are traversed by a screw (not shown) which screws into tappings 15b provided at the top of the ribs 15.

Figure 4:
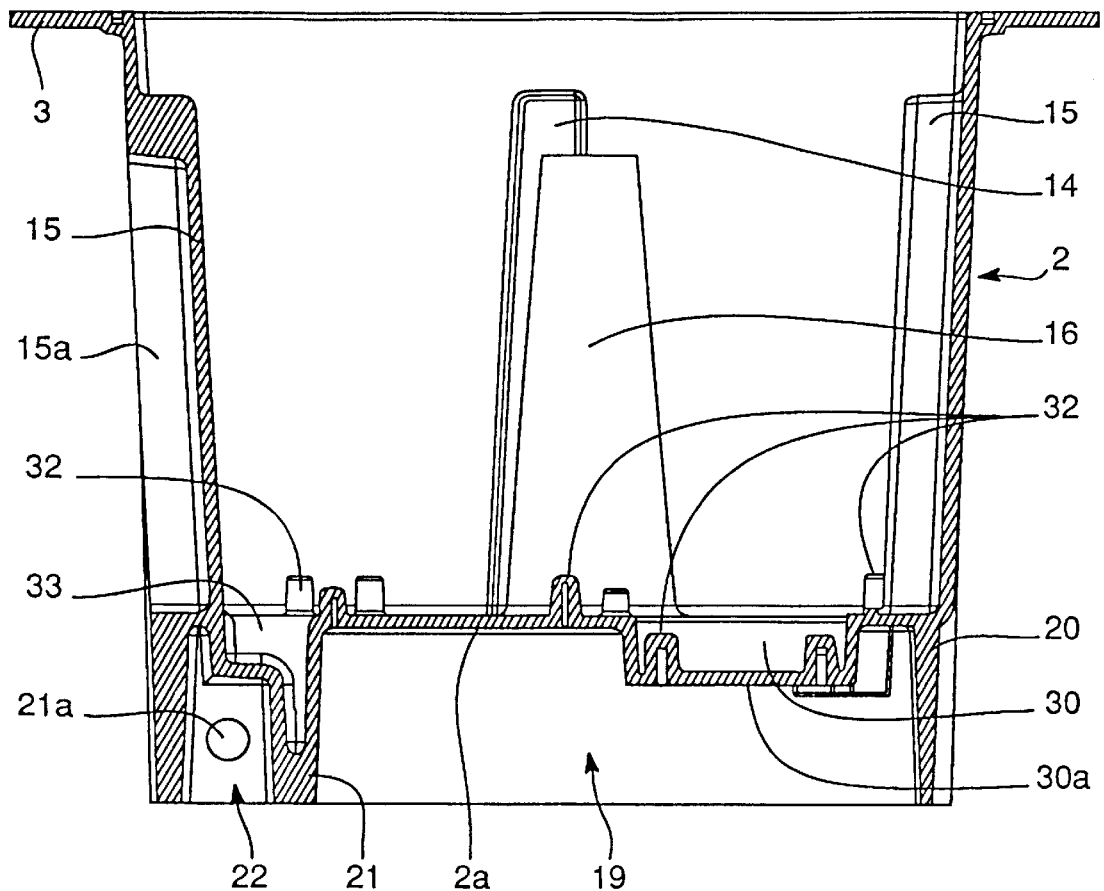
FIG. 4 is a cross-sectional view broken in parallel planes, on the line IV of the receptacle of FIG. 3.

As can be seen in FIGS. 3 and 4, the internal side walls of the receptacle 2 are slightly upwardly outwardly flared, which facilitates mounting the tongues 12 and 13 within the receptacle 2.

The ribs 14 and 15 stop at a distance from the upper edge of the receptacle 2 sufficient to receive completely the crown 11 within the receptacle 2, the portion of the housing of inductor 8 located above the crown 11, as well as the cover 9, being themselves positioned within the hole 4b of the cast iron plate 4.

The bottom 2a of the receptacle 2 comprises, substantially in its center, a conical chimney 16 extending substantially vertical over a portion of the height of the receptacle 2. This chimney 16 is hollow and opens at its base 16a through the bottom 2a of the receptacle 2 (see FIG. 2) and at its top terminates with an opening 16b concentric with the housing of inductor 8 for the passage of the conductive cable connecting the inductor 8 to an electronic power system (not shown), a section 17 of this cable being shown in FIG. 1, a packing 18 being threaded onto cable 18 to ensure sealing at the level of the opening 16b of the chimney 16. The housing of inductor 8 comprises at its base 8b a hollow bottom in the form of a bell adapted to surround laterally the summit of the chimney 16.

As seen in FIG. 2, the chimney 16 opens at its base 16a into a compartment 19 defined immediately below the bottom 2a of the receptacle 2 and delimited laterally by a downwardly extending peripheral skirt 20 of the receptacle 2. In this compartment 19 is disposed and retained the electronic power system which is constituted by one or several electronic cards comprising particularly power transistors which give off substantial heat in operation.

The lateral peripheral skirt of the receptacle 2 moreover comprises an internal partition 21 delimiting a recess 22 in which is disposed a set of terminals 23 shown in FIG. 1. The recess 22 opens outwardly through an opening 20a to permit the passage of a high voltage electrical supply cable, of which a portion is shown at 24 in FIG. 1, from the overall electrical supply grid. This cable 24 is connected to a connector 25 for connection through the opening 20a of skirt 20 with the terminals 23. In FIG. 4, it will be seen that the recess 22 has an opening 21a through the internal partition 21 to permit electrical connection between the terminals 23 and the electronic power system disposed in compartment 19.

A lower closure plate (not shown) is adapted to close the bottom of compartment 19, with the interposition of an elastomeric sealing joint 26 which has a shape corresponding to the periphery of the compartment 19. Similarly, another small closure plate (not shown) is adapted to close the bottom of the recess 22 with the interposition of a rectangular sealing joint 27. The fact of providing an independent closure plate for the recess 22 permits verifying the connection at the connection terminals 23, without having to open the compartment 19 in which is disposed the electronic power system, which is particularly fragile.

Figure 5:
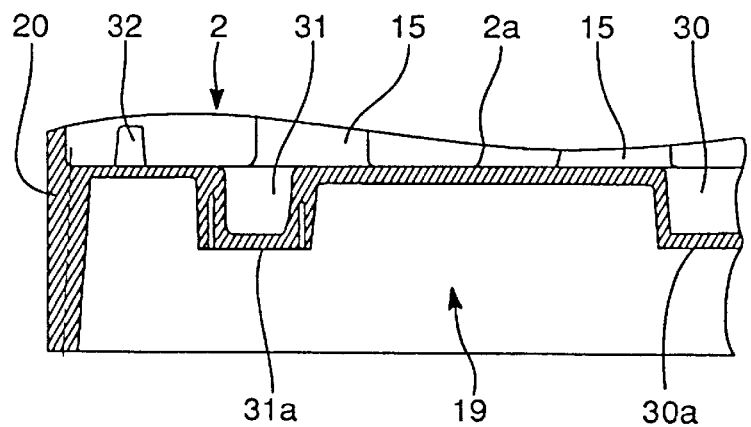
FIG. 5 is a fragmentary cross-sectional view on the line V of the receptacle of FIG. 3.

The bottom 2a of the receptacle 2 moreover comprises several reinforcements 30 and 31 which project inwardly of the compartment 19, as shown in FIGS. 2, 4 and 5. These reinforcements 30 and 31 comprise a flat bottom 30a, 31a respectively, to permit placing thereagainst an electronic card at a distance from the rest of the bottom 2 of the receptacle 2. More precisely, the flat bottoms 30a and 31a of the reinforcements 31 are adapted to permit the securement of a power transistor which is screwed to the flat bottom.

On the upper surface of the bottom 2a and of the rectangular reinforcement 30, are provided a plurality of upwardly projecting lugs 32, which are adapted to permit the screwing of electronic components located in the compartment 19 through the bottom of the receptacle 2, without thereby passing through it.

The bottom 2a of the receptacle 2 comprises moreover a reinforcement 33 located in vertical alignment with the recess 22, which is adapted to facilitate evacuation of the heat from the recess 22.

The operation of the device of the invention will now be briefly described with reference to the drawings. Once the assembly of the device shown in an exploded manner in FIG. 1 is mounted in the reinforced concrete box 1, the internal space of the receptacle 2 is entirely filled with a heat transfer liquid, such as transformer oil or a mixture of water and liquid antifreeze, before closing the assembly with the cast iron plate 4.

In service, that is to say when the electronic power system has received a control signal triggering its actuation to give rise to the transfer of energy by electromagnetic induction between the inductor 8 and an induction circuit carried for example by an automotive vehicle parked above the cast iron plate 4 to recharge the battery of the vehicle, the electronic power components of the system heat up by the Joule effect. Such a system using generally power transformers, these latter giving off substantial heat, of the order of 200 watts, within the interior of the compartment 19, which could give rise to breakdown of the electronic system if the temperature exceeded about 50–60° C. As the power transistors are in contact with the metallic bottom 30a, 31a of the reinforcements 30, 31 provided in the bottom 2a of the receptacle 2, the heat is transmitted by the bottom 2a of thermally conductive metal, for example aluminum, to the heat transfer liquid contained in the receptacle, which gives rise to agitation of the liquid by the thermosiphon effect, the hot liquid rising upwardly in the receptacle where it is cooled before re-descending toward the bottom with a movement of circulation substantially in a loop. The presence of the chimney 16 permits the heat generated by the power transistors to rise along the chimney and hence to accelerate the rising movement of the hot liquid upwardly, which reduces the time necessary to heat the liquid and thereby promotes a more rapid dissipation of the heat in the liquid.

Moreover, as the housing of inductor 8 comprises a hollow bottom 8b which is immersed in the upper region of the receptacle 2, for example in a region of the order of 15 cm of water from the upper surface, the warm liquid which rises toward the surface is cooled more rapidly by discharge of the heat along the housing of inductor 8 toward the exterior.

The cooling device of the invention therefore permits effective cooling of the electronic components located in the lower compartment of the receptacle 2, without using any supplemental drive mechanism consuming energy as is the case with a fan or a cold water circulation pump. Breakdowns of the system are thus minimized and its maintenance is facilitated. The receptacle 2 can act like a radiator containing a liquid which ensures the cooling by thermosiphon effect.

Although the invention has been described in connection with a particular embodiment, it is of course evident that it is not in any way limited and comprises all technical equivalents of the means described, as well as their combinations, if these are within the scope of the invention.

I claim:

1. In a cooling device including an electronic power system, said system being connected at an inlet to an electrical supply cable (24) and at an outlet to a conductive cable (17) connected to a system (8) for transmission of current, the device being adapted to be buried in the ground in a concrete box (1) such that the current transmission system will be adapted to transmit a current into an external electrical machine; the improvement comprising:

a sealed metallic receptacle (2) filled with heat transfer liquid;

a hollow chimney extending vertically from a bottom of the receptacle;

a sealed compartment (19) located below the bottom (2a) of the receptacle, the sealed compartment opening to the hollow chimney;

wherein the electronic power system is disposed within the sealed compartment, at least one electronic power component of the electronic power system being directly fixed to a lower surface of the bottom of the receptacle, in a predetermined position so as to give rise in the receptacle (2) to an agitation of the heat transfer liquid by a thermosiphon effect without causing evaporation of the heat transfer liquid.

2. A device as claimed in claim 1, wherein the current transmission system comprises an inductor connected to the conductive cable (17) and disposed in a housing, the housing of the inductor (8) being immersed in the heat transfer liquid contained in the metallic receptacle, said inductor being adapted to give rise to induced current in an electrical machine located above the inductor, thereby to permit recharging of a battery of an automotive vehicle.

3. Device according to claim 1, further comprising:
a cable aperture disposed in a top surface of the chimney; and
a packing constructed to form a seal between the conductive cable and a perimeter of the cable aperture, so that the conductor cable may pass in a sealed manner from an interior of the receptacle to the sealed compartment through the top surface of the chimney.

4. Device according to claim 3, wherein the chimney (16) is located substantially at a the center of the receptacle (2), and electronic power components are fixed to the bottom (2a) of the receptacle in positions spaced about the base of the chimney.

5. Device according to claim 3, wherein a housing of the current transmission system (8) comprises at its base (8b) a hollow bottom in the form of a bell adapted to cap laterally an upper end of the chimney (16), such that said bell is immersed in an upper region of the heat transfer liquid.

6. Device according to claim 1, wherein the bottom (2a) of the receptacle (2) comprises at least one reinforcement (30, 31) projecting into the compartment (19) of the electronic power system, the electronic power component or components being fixed on the lower surface (30a, 30b) of the bottom of the reinforcement or reinforcements.

7. Device according to claim 1, wherein the bottom (2a) of the receptacle (2) comprises lugs (32) projecting inwardly of the receptacle to permit placing in the receptacle securement means for the electronic components, from the lower surface of the bottom of the receptacle.

8. Device according to claim 1, wherein the receptacle (20) comprises at its base a peripheral downwardly extending skirt (20) delimiting with the lower surface of the bottom (2a) of the receptacle the sealed compartment (19).

9. Device according to claim 8, wherein the bottom of the sealed compartment (19) is closed by a first closure plate with the interposition of a sealing joint (26) between the first closure plate and a lower edge of the skirt (20) of the receptacle (2).

10. Device according to claim 8, wherein the skirt (20) comprises an internal partition (21) delimiting a recess (22) separated from a remainder of the sealed compartment (19) to receive terminals (23) between said electronic power system and the supply cable (24), said recess opening through a first hole (21a) provided in the internal partition into the compartment of the electronic power system for electrical connection between said system and the terminals, said recess also opening through a second hole (20a) provided in an external wall of the skirt for passage of the supply cable.

11. Device according to claim 10, wherein a bottom of the recess (22) is closed by a second closure plate independent of the first closure plate of the compartment (19), with an interposing sealing joint (27).

12. Device according to claim 2, wherein the receptacle (2) comprises on its internal side wall support means (14, 15) coacting with bearing means (12, 13) fixed to the housing of the inductor (8), to position and support the housing of the inductor within the receptacle.

13. Device according to claim 12, wherein the support means (14, 15) are formed by vertical ribs projecting from internal side walls of the receptacle (2) and the bearing means (12, 13) are comprised by tongues extending in a plane perpendicular to a vertical axis of the receptacle, from a metallic crown (11) secured to the housing of the inductor (8), said tongues being adapted to rest on tops of said ribs.

14. Device according to claim 13, further comprising securement means adapted to pass through at least one said tongue (13) and its associated said rib (15), to immobilize the housing of the inductor (8) in the receptacle (2).

15. Device according to claim 2, wherein the receptacle (2) comprises on its upper edge a peripheral collar (3) extending outwardly in a plane perpendicular to a vertical axis of the receptacle, to receive thereon an upper closure plate (4) adapted to be positioned at ground level.

16. Device according to claim 15, wherein said upper closure plate (4) comprises a central hole (4b) receiving a plastic over (9) which is fixed to the top of the housing of the inductor (8).

17. Device according to claim 15, wherein said collar (3) is rests on the upper peripheral edge of the concrete box to facilitate heat transfer between the receptacle (2) and surrounding earth.

18. Device according to claim 1, wherein the electronic power components of the system are power transistors.

19. Device according to claim 1, wherein the receptacle (2) has a substantially truncated pyramidal shape whose large base opens upwardly.

20. Device according to claim 1, wherein the system for transmission of current is connected to the conductive cable (17) which passes through the receptacle (2) over all its height, said current transmission system being external to the receptacle.

* * * * *